US006212865B1

(12) United States Patent
Peeters et al.

(10) Patent No.: US 6,212,865 B1
(45) Date of Patent: Apr. 10, 2001

(54) WINDROW MERGER

(75) Inventors: Kenneth J. Peeters, Bear Creek; Gregory L. Landon, Shawano, both of WI (US)

(73) Assignee: H&S Manufacturing Co., Inc., Marshfield, WI (US)

( * ) Notice: Subject to any disclaimer, the term of this patent is extended or adjusted under 35 U.S.C. 154(b) by 0 days.

(21) Appl. No.: 09/258,968

(22) Filed: Feb. 26, 1999

(51) Int. Cl.$^7$ ..................................... A01D 7/00
(52) U.S. Cl. ................. 56/366; 56/370; 56/345; 56/DIG. 21
(58) Field of Search ............................. 56/344, 345, 354, 56/355, 358, 365, 366, 370, 375, 376, DIG. 21, DIG. 10, 14.9, 341

(56) References Cited

U.S. PATENT DOCUMENTS

| | | |
|---|---|---|
| 1,906,606 | 5/1933 | Hyman . |
| 2,343,583 * | 3/1944 | Rogers .................................. 56/345 |
| 2,629,223 | 2/1953 | Russell . |
| 2,636,335 | 4/1953 | Whitney . |
| 2,718,746 | 9/1955 | Prischmann . |
| 2,741,892 | 4/1956 | Collette . |
| 2,761,270 | 9/1956 | Blaser et al. . |
| 2,795,100 * | 6/1957 | Sund ..................................... 56/345 |
| 2,906,351 | 9/1959 | Johnson . |
| 3,128,589 * | 4/1964 | Van Der Lely et al. .............. 56/365 |
| 3,141,284 | 7/1964 | Reynolds . |
| 3,221,484 | 12/1965 | Van Der Lely . |
| 3,514,937 * | 6/1970 | Batog ..................................... 56/345 |
| 3,591,950 * | 7/1971 | Weichel ................................. 56/344 |
| 3,667,200 | 6/1972 | Pool et al. . |
| 3,702,052 | 11/1972 | Klassen . |
| 3,714,766 * | 2/1973 | Ender et al. ........................... 56/344 |
| 3,721,080 | 3/1973 | Marsh . |
| 3,884,022 | 5/1975 | Landolt . |
| 4,040,490 | 8/1977 | Anderson . |
| 4,078,366 | 3/1978 | Carmichael . |
| 4,315,546 | 2/1982 | Fahrenholz . |
| 4,403,468 | 9/1983 | Yoder . |
| 4,730,447 | 3/1988 | Fisher et al. . |
| 4,738,092 | 4/1988 | Jennings . |
| 4,785,614 | 11/1988 | Schoenherr . |
| 4,793,125 * | 12/1988 | Ehrhart et al. ......................... 56/370 |
| 4,793,129 * | 12/1988 | Ehrhart et al. ......................... 56/370 |
| 4,910,951 | 3/1990 | Reilly et al. . |
| 5,025,616 | 6/1991 | Moss . |
| 5,177,944 * | 1/1993 | Finlay ..................................... 56/365 |
| 5,203,154 | 4/1993 | Lesher et al. . |
| 5,272,860 * | 12/1993 | Baril et al. ............................. 56/366 |
| 5,301,496 * | 4/1994 | Sudbrack et al. ...................... 56/366 |
| 5,450,717 * | 9/1995 | Delperdang et al. .................. 56/366 |
| 5,507,139 * | 4/1996 | Delperdang et al. .................. 56/366 |
| 5,799,474 * | 9/1998 | Ingram ................................ 56/14.5 |

* cited by examiner

*Primary Examiner*—Thomas B. Will
*Assistant Examiner*—Nathan Mammen
(74) *Attorney, Agent, or Firm*—Patterson, Thuente, Skaar & Christensen, P.A.

(57) ABSTRACT

A windrow merger for merging product material disposed in a windrow on a ground surface, the windrow merger having a transverse conveyor assembly carried on a merger fame, at least a portion of the frame underlying the transverse conveyor assembly, a tongue operably pivotally coupled to the merger frame, the tongue being couplable to a vehicle for towing the windrow merger, the windrow merger includes a pickup head having a pickup conveyor system including a rotatable pickup conveyor belt for picking up product material disposed in a windrow on a field surface. The pickup head is pivotally coupled to the merger frame and has a leading pickup edge. The pickup head has a suspension for suspending the leading pickup edge such that the leading pickup edge exhibits two degrees of motional freedom.

43 Claims, 14 Drawing Sheets

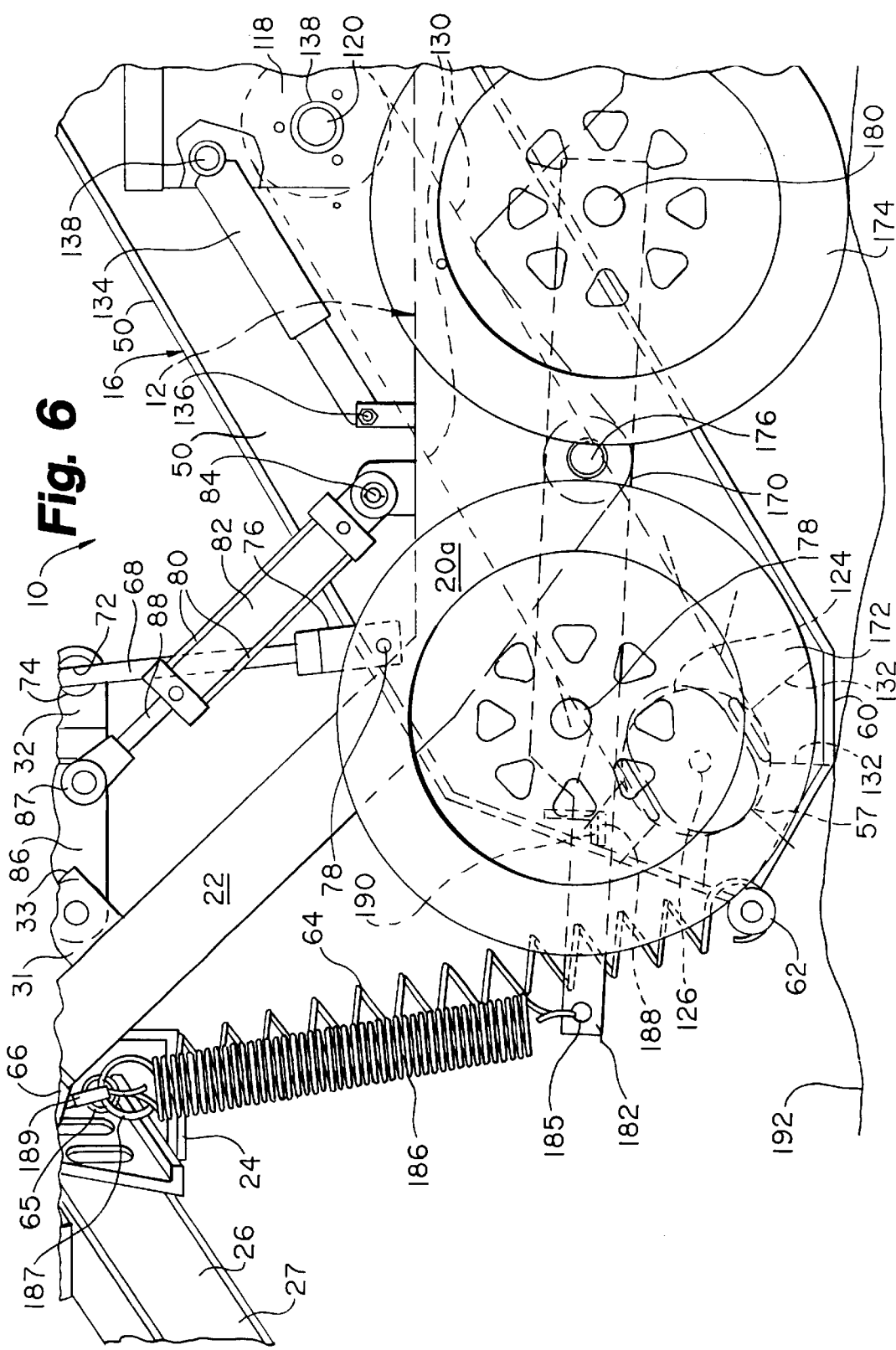

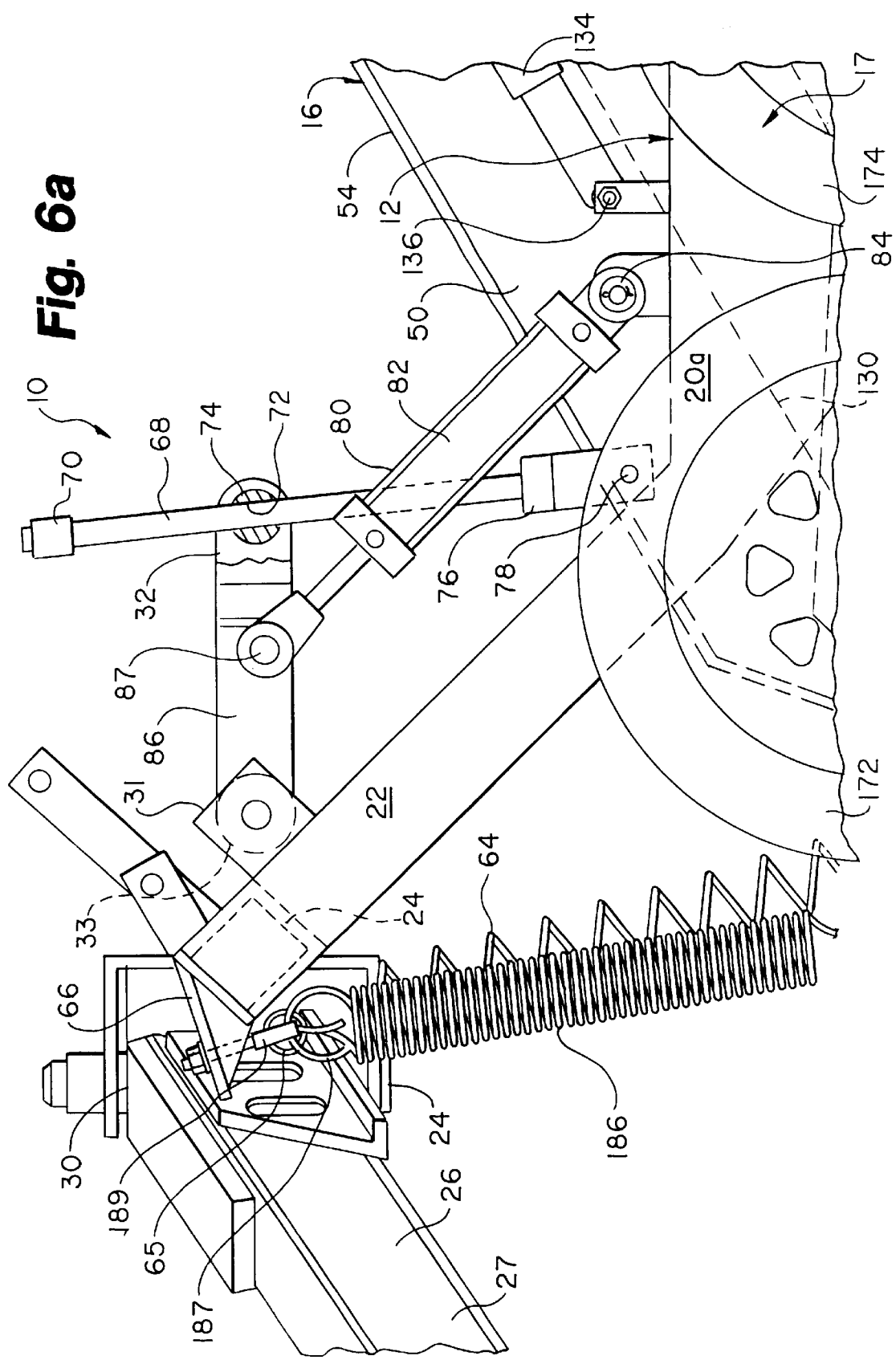

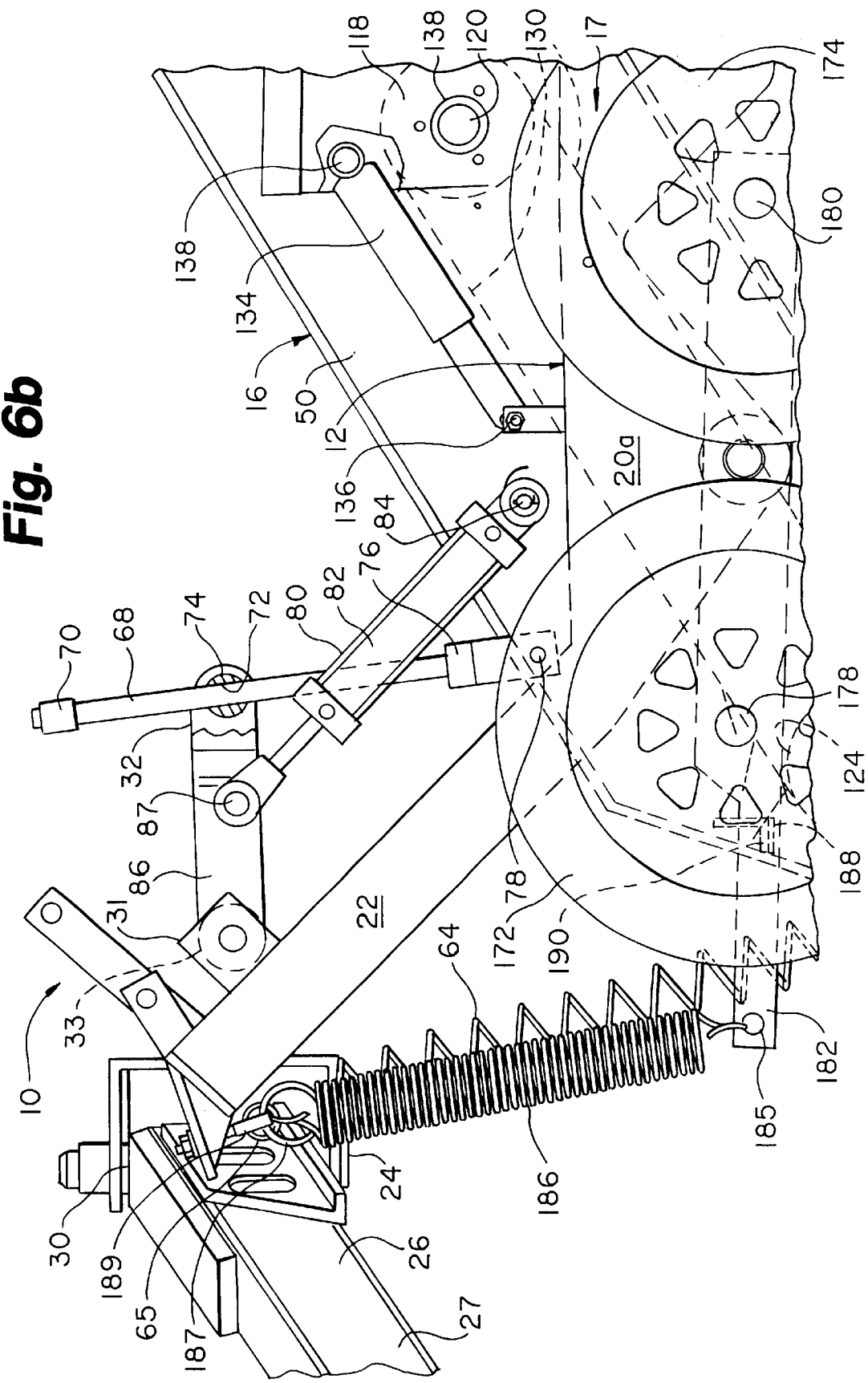

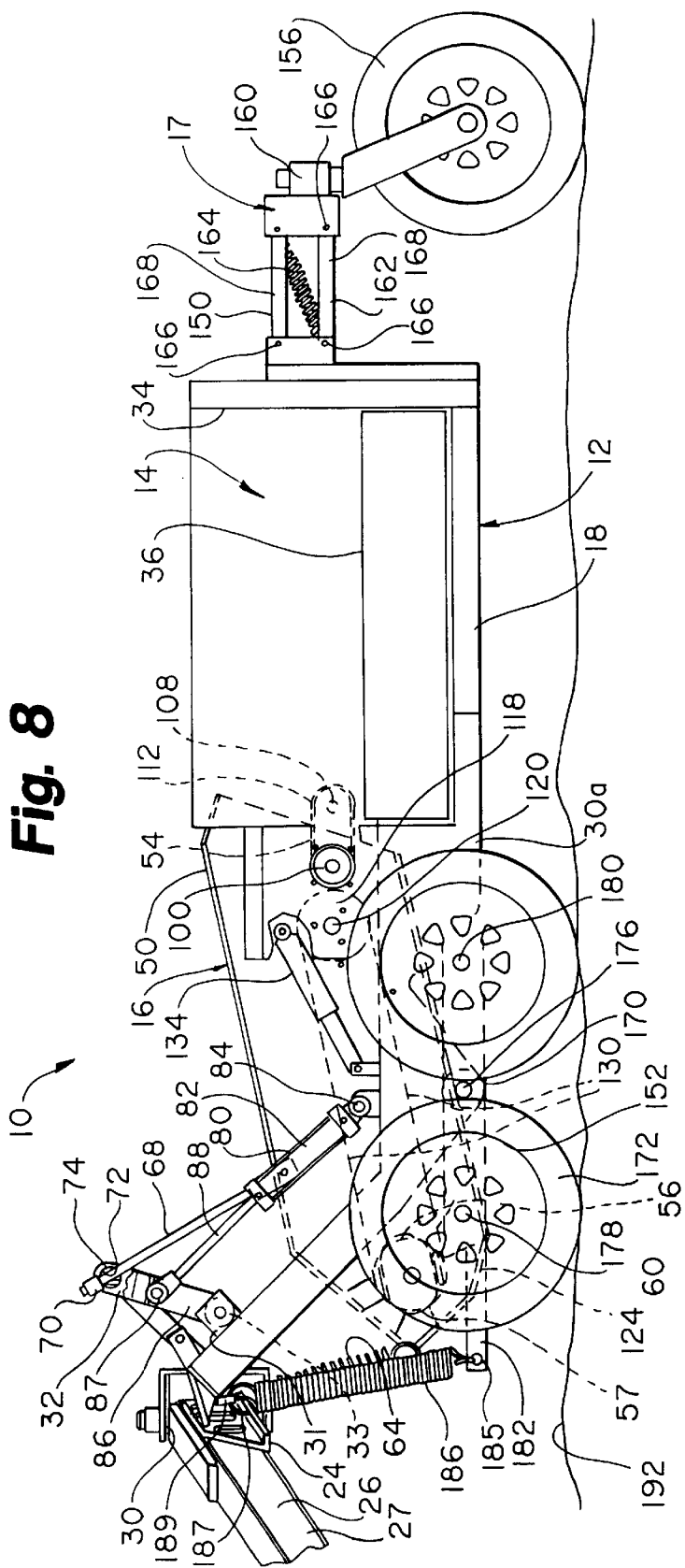

WINDROW MERGER

TECHNICAL FIELD

The present invention relates to a towable farm implement. More particularly, the present invention relates to a device for merging one or more windrows in a field.

BACKGROUND OF THE INVENTION

When a feed product, such as alfalfa, or a grain product, such as wheat and oats, is ready to be harvested, the product may be too moist for further processing after cutting. In such cases the product is typically cut and left in long generally parallel windrows in the field. The product is left in such windrows to afford drying of the product by the wind and sun. After several days of drying in the field, the windrow is typically picked up and the product may be either stored or further processed.

In order to minimize the number of windrows that must be picked up, it makes economic sense to merge one or more windrows into a single windrow. The single remaining windrow may then be picked up as desired. Accordingly, there is a need in the industry for a windrow merger that is capable of efficiently picking up a windrow in a field and moving the product comprising the windrow in a transverse direction to be merged with another windrow. The merger must have a wide pickup head in order to accommodate the widest of windrows. It is desirable that such pick up be accomplished in an efficient manner. Accordingly, the windrow merger should be able to efficiently pick up the windrow on flat surfaces, but also through areas of unevenness in the surface of the field. Additionally, the windrow merger must work as closely as possible to the field surface in order to pick up as much of the material comprising the windrow as possible while being towed at the greatest possible practical forward speed. Further, the material comprising the windrow must be handled effectively without plugging up the windrow merger thereby allowing continuous operation without the need to stop and unplug the merger.

SUMMARY OF THE INVENTION

The windrow merger of the present invention substantially meets the aforementioned needs of the industry. The pickup head of the windrow merger is designed to operate in close proximity to the surface of the field in which the windrow is deposited even though the instant pickup head is significantly wider than current pickup heads. By operating close to such surface the windrow merger of the present invention is able to efficiently pick up a very high portion of the product material comprising the windrow. Further, the pickup head of the windrow merger is able to accommodate undulations and other variations in the surface of the field while still maintaining a close proximity to the surface while operating at towed speeds in excess of 10 mph. Further, the windrow merger is capable of efficiently picking up the product material comprising the windrow and depositing it in a translational direction while substantially avoiding clogging any of the components necessary to pick up the product material and move it in the translational direction.

The present invention is a windrow merger for merging product material disposed in a windrow on a ground surface. The windrow merger has a transverse conveyor assembly carried on a merger fame, at least a portion of the frame underlying the transverse conveyor assembly, and a tongue operably pivotally coupled to the merger frame, the tongue being couplable to a vehicle for towing the windrow merger.

The windrow merger includes a pickup head having a pickup conveyor system including a rotatable pickup conveyor belt for picking up product material disposed in a windrow on a field surface. The pickup head is pivotally coupled to the merger frame and has a leading pickup edge. The pickup head has suspension means for suspending the leading pickup edge such that the leading pickup edge exhibits two degrees of motional freedom.

DETAILED DESCRIPTION OF THE DRAWINGS

FIG. 6 is a an enlarged left side elevational view of the left truck assembly as depicted in FIG. 5;

FIG. 6a is an enlarged left side elevational assembly of FIG. 6;

FIG. 6b is an enlarged left side elevational view of the left truck assembly of FIG. 6;

FIG. 8 is a left side elevational view of the windrow in the transport disposition, with certain components depicted in phantom;

DETAILED DESCRIPTION OF THE DRAWINGS

Figure 1:
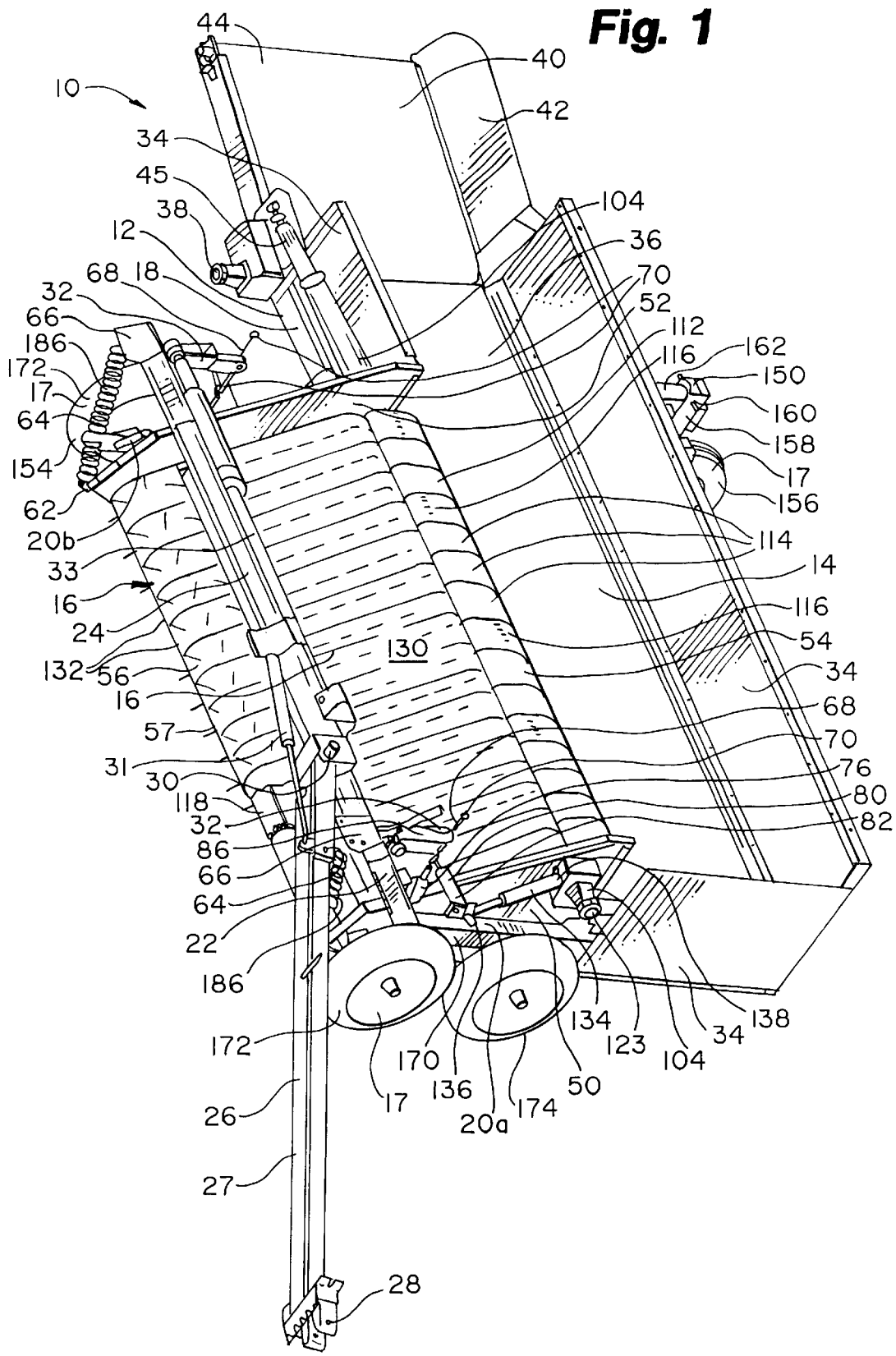
FIG. 1 is a front perspective view of the windrow merger of the present invention.

The windrow merger of the present invention is shown generally at 10 in the figures. Windrow merger 10 has four major components: frame 12, transverse conveyor assembly 14, pickup head 16, and tricycle suspension 17.

Figure 2:
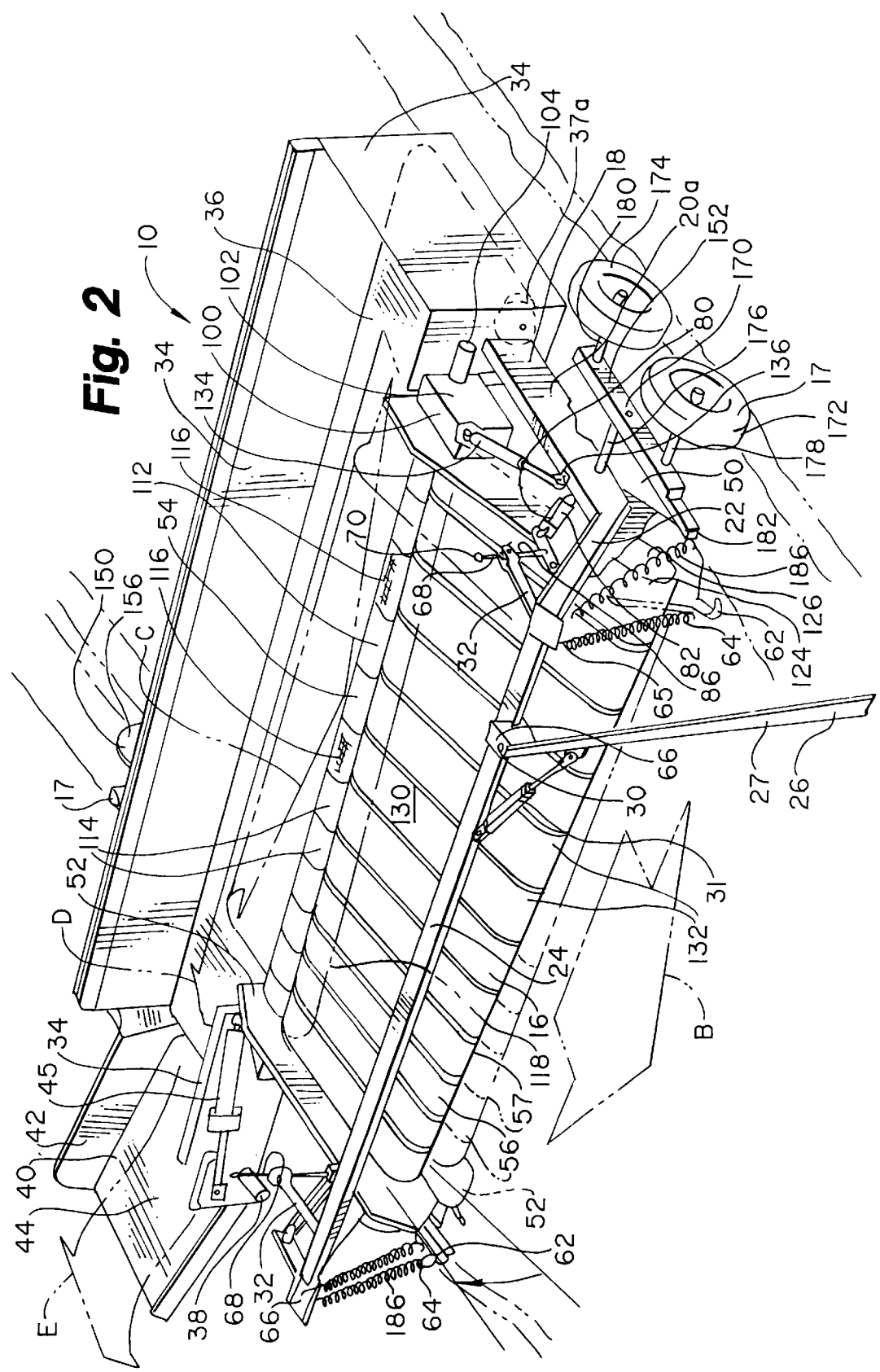
FIG. 2 is a front perspective view of the windrow merger depicting the twisting action of the pickup head that accommodates variations in height of the field surface of the left side of the windrow merger as compared to the right side of the windrow merger.

The frame 12 is the first major component of the windrow merger 10. Referring to FIGS. 1 and 2, the frame 12 of the windrow merger 10 is formed of a box section frame 18. The box section frame 18 substantially underlies and supports the transverse conveyor assembly 14. A pair of substantially parallel cantilever beams 20a, 20b project forward from the box section frame 18. The cantilever beam 20a is disposed substantially coincident with the left side of the windrow merger 10. The cantilever beam 20b is disposed spaced apart from the cantilever beam 20a toward the right side of the windrow merger 10. A cross member support 22 projects upward at an angle from the distal end of each of the respective cantilever beams 20a, 20b. The two cross member supports 22 support a cross member 24 extending between the two supports 22.

An elongate tongue 26 is coupled to the cross member 24. The tongue 26 has a tongue shank 27. The tongue shank 27 includes a clevis 28 at a first end thereof for being removably coupled to the tow bar of a tractor or the like. A pivot 30 pivotally couples the tongue shank 27 to the cross member 24. Preferably, a hydraulic cylinder (not shown) may be coupled to the tongue shank 27 and to the cross member 24 proximate the center point of the cross member 24. The hydraulic cylinder (not shown) may be used to adjust the angle between the tongue 26 and the cross member 24. Such angle affects the distance that the windrow merger 10 will be disposed to the right side of the tractor pulling the windrow merger 10.

Figure 9:
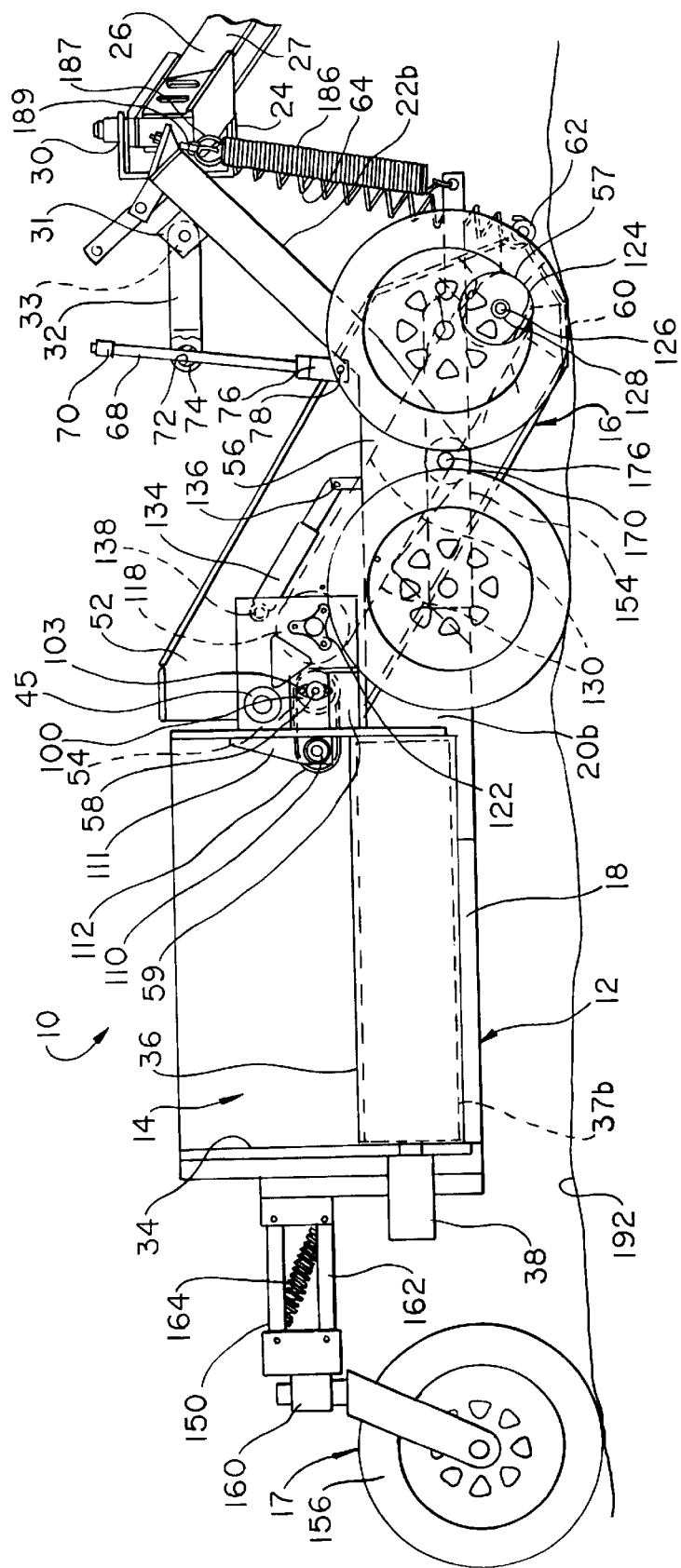
FIG. 9 is a right side elevational view of the windrow in the transport disposition, with certain components depicted in phantom.

A pair of spaced apart, rearward directed stop arms 32 are coupled to the cross member 24. The left stop arm 32 and the right stop arm 32 are each fixedly coupled to a rotatable tube 33. Tube 33 is rotatably supported in brackets 31 fixedly coupled to the rear surface of the cross member 24. An end view of the brackets 31 and the tube 33 is depicted in FIGS. 3 and 9.

Figure 3:
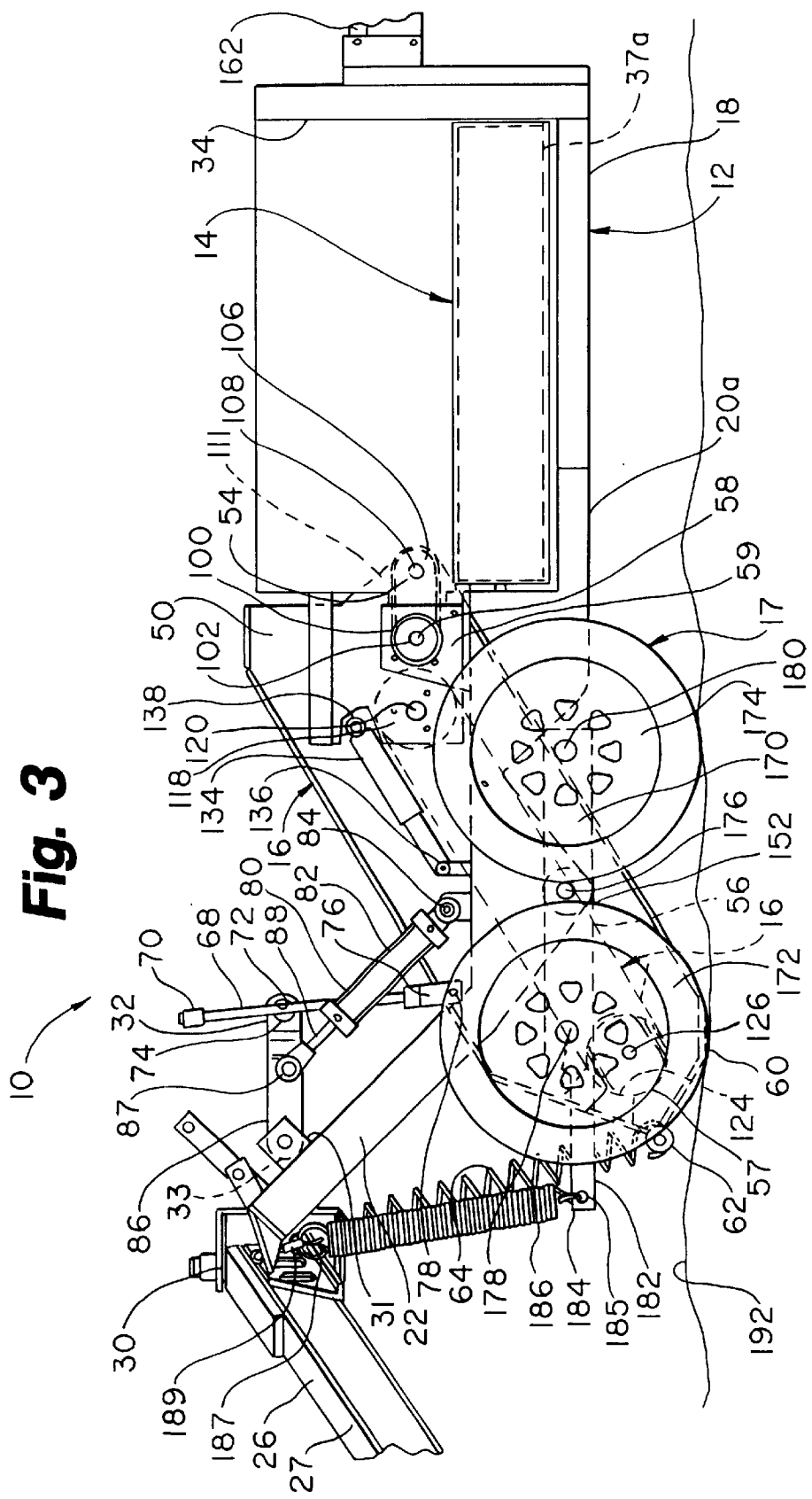
FIG. 3 is a left side elevational view of the windrow merger of FIG. 1 having certain components depicted in phantom.

The second major component of the windrow merger 10 is the transverse conveyor assembly 14 as depicted in FIGS. 1–3. The transverse conveyor assembly 14 includes a plurality of generally upright side members 34. The side members 34 confine the product material (forage) during the transverse shifting of the product material picked up by the windrow merger 10. The transverse shifting of the product material is effected by a transverse conveyor 36. The transverse conveyor 36 is supported on at least two rotors 37a, 37b, depicted in FIGS. 2, 3 and 9. The rotors are a left rotor 37a at the left terminus of the transverse conveyor 36 and a right rotor 37b at the right terminus of the transverse conveyor 36. The right rotor 37b is the driven rotor and it is preferably driven by a hydraulic motor 38.

An optional chute 40 (FIGS. 1 and 2) is provided in order to project the product material an even greater distance rightward of the point of pickup. The chute preferably has side members 42 for containing the product material and a chute conveyor 44 for discharging the product material out the right side of the chute 40. The chute conveyor 44 is powered by the hydraulic motor 38. The motor 38 simultaneously drives the transverse conveyor 36 and the chute conveyor 44 by means of two sprockets and a drive chain in the same manner as will be explained with respect to motor 104a. Other suitable split drive means may also be used.

The elevation of the chute 40 is adjustable to affect the discharge of product to be merged. A hydraulic piston 45 is available to raise and lower the chute 40 as desired to control the distance from the merger 10 that the product material is deposited after discharge.

The third major component of the windrow merger 10 is the pickup head 16. The pickup head 16 is comprised of four major subcomponents: side members 50, 52, draper conveyor system 54, and pickup conveyor system 56.

As depicted in FIG. 1, the side members 50, 52 are spaced apart and disposed at the left and right margins of the pickup head 16, respectively. When the windrow merger 10 is supported on level ground, the side members 50, 52 are disposed in a generally parallel relationship, but the side members 50, 52 respond to up-down motion inputs independently, thereby accommodating a first degree of pickup head motion (up-down motion) and a second degree of pickup head motion (side-to-side twisting motion). The side members 50, 52 have a generally triangular shape, with the hypotenuse of the triangle generally following the slope of the pickup conveyor system 56 forward downward to the point of product material pickup, leading pickup edge 57. Leading pickup edge 57 comprises the full leading edge of the pickup conveyor system 56. The side members 50, 52 and in fact the entire pickup head 16 are free to pivot relative to the transverse conveyor assembly 14. In order to effect such pivoting, the side members 50, 52 are supported on a pair of spaced apart transverse pivot journals 58, the left journal 58 being depicted in FIG. 3 and the right journal 58 being depicted in FIG. 9. The transverse pivot journals 58 are supported by flanges 59 that are fixedly coupled to and supported by the cantilever beams 20a, 20b, respectively (see also FIG. 11). An extension of the axial bar 102 of the driven rotor 100 of the draper conveyor system 54 is borne in the two journals 58.

Each of the side members 50, 52 has a lower, forward skid surface 60 that functions as a skid that rides on the ground surface, thereby assisting in positioning the leading pickup edge 57 of the pickup conveyor system 56 proximate the ground surface. See FIGS. 3 and 9.

A suspension post 62 (FIGS. 4–6) projects transversely outward from the forward portion of each of the side members 50, 52. A first end of a pickup head spring 64 is connected to the suspension post 62 of each of the side members 50, 52. The second end of the pickup head spring 64 is coupled to an I bolt 65. The I bolt 65 is coupled to attachment bracket 66 welded to the cross member 24. See FIGS. 5 and 6a. The pickup head springs 64 serve to exert an upward bias and support on the leading pickup edge 57 of the pickup head 16.

Referring to FIGS. 3–6b and 9, generally upwardly directed stop rods 68 are pivotally coupled to the upper margin of each of the side members 50, 52. Each of the stop rods 68 has a threaded stop 70 that is threadingly engaged with the upper portion of the stop rod 68. The stop rods 68 are slidably engaged in a bore 72 defined in a transverse rotatable carrier 74 (depicted in section) disposed proximate the distal end of the stop arm 32. The stop rod 68 is affixed proximate the upper margin of the respective side members 50, 52 by a clevis coupling 76 and a clevis pen 78.

The pickup head 16 further includes a lift assembly 80. The lift assembly 80 is useful in shifting the pickup head 16 from a lowered pickup configuration as depicted in FIGS. 1–6 and 9 to a generally raised transport configuration as depicted in FIG. 8. The lift assembly 80 is mounted on the left side of the pickup head 16 only, but acts to shift both the left and right sides of the pickup head simultaneously.

The lift assembly 80 includes a hydraulic cylinder 82. The hydraulic cylinder is powered by hydraulic fluid delivered via hydraulic lines 83. The hydraulic cylinder 82 is rotatably coupled at a first end to the cantilever beam 20a by a beam coupling 84. The hydraulic cylinder 82 is rotatably coupled at a second end to a lift link 86 by coupler 87. The lift link 86 is preferably fixedly coupled to the left stop arm 32.

Extension of the piston arm 88 from the retracted disposition of FIG. 3 to the extended disposition of FIG. 8 results in shifting of the pickup head 16 from the lowered pickup configuration to the raised transport configuration of FIG. 8. Likewise, retraction of the piston arm 88 lowers the pickup head 16 to the pickup configuration. Initially, the extension referred to above causes each of the two stop rods 68 to translate downward within the bores 72. The upward retraction of the left stop arm 33 is transmitted to the right stop arm 32 by means of the rotatable tube 33 such that the left and right stop arms 32 rotate in unison. The threaded stop 70 of each of the stop rods 68 comes into contact with the respective rotatable carrier 74.

Further extension of the piston arm 88 rotates both the left and right stop arms 32 upward from the nearly horizontal disposition of FIG. 3 to the nearly vertical disposition of FIG. 8. Such further translation, with the threaded stops 70 engaged with the rotatable carriers 74, results in the front end of the pickup head 16 being raised to the transport disposition as depicted in FIG. 8 by the two stop rods 68. As indicated above, the raising action of the hydraulic cylinder 82 acting on the left stop arm 32 simultaneously raises the right stop arm 32 by rotating the tube 33 to which the right stop arm 32 is fixedly coupled. Accordingly, both the left and right sides of the pickup head 16 are simultaneously raised by the action of the hydraulic cylinder 82 acting only on the left stop arm 32. As depicted in FIG. 8, the leading pickup edge 57 of the pickup head 16 is raised well above the ground for transport of the windrow merger 10.

Figure 10:
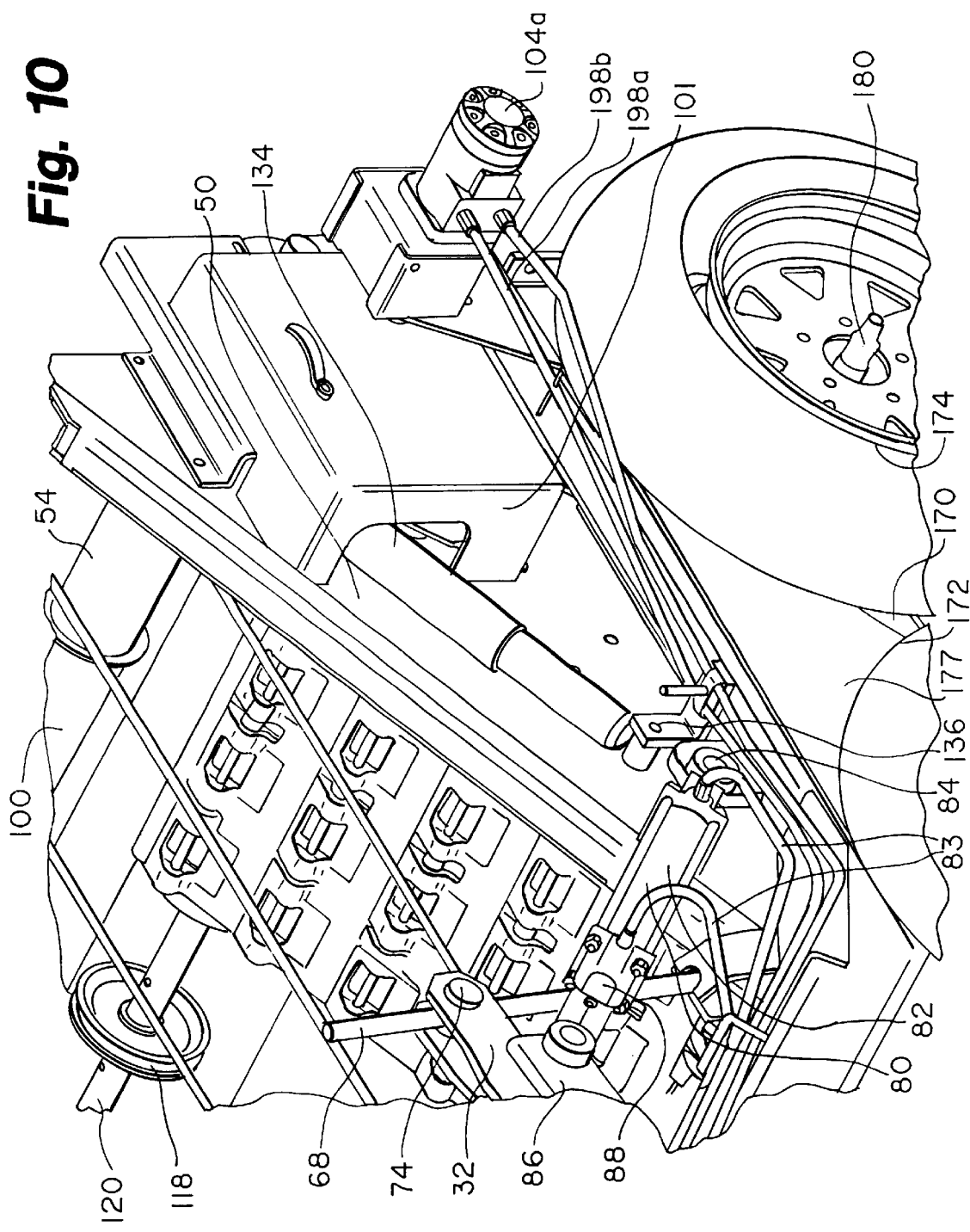
FIG. 10 is a perspective view of the covered drive for the pickup and draper conveyors.
Figure 11:
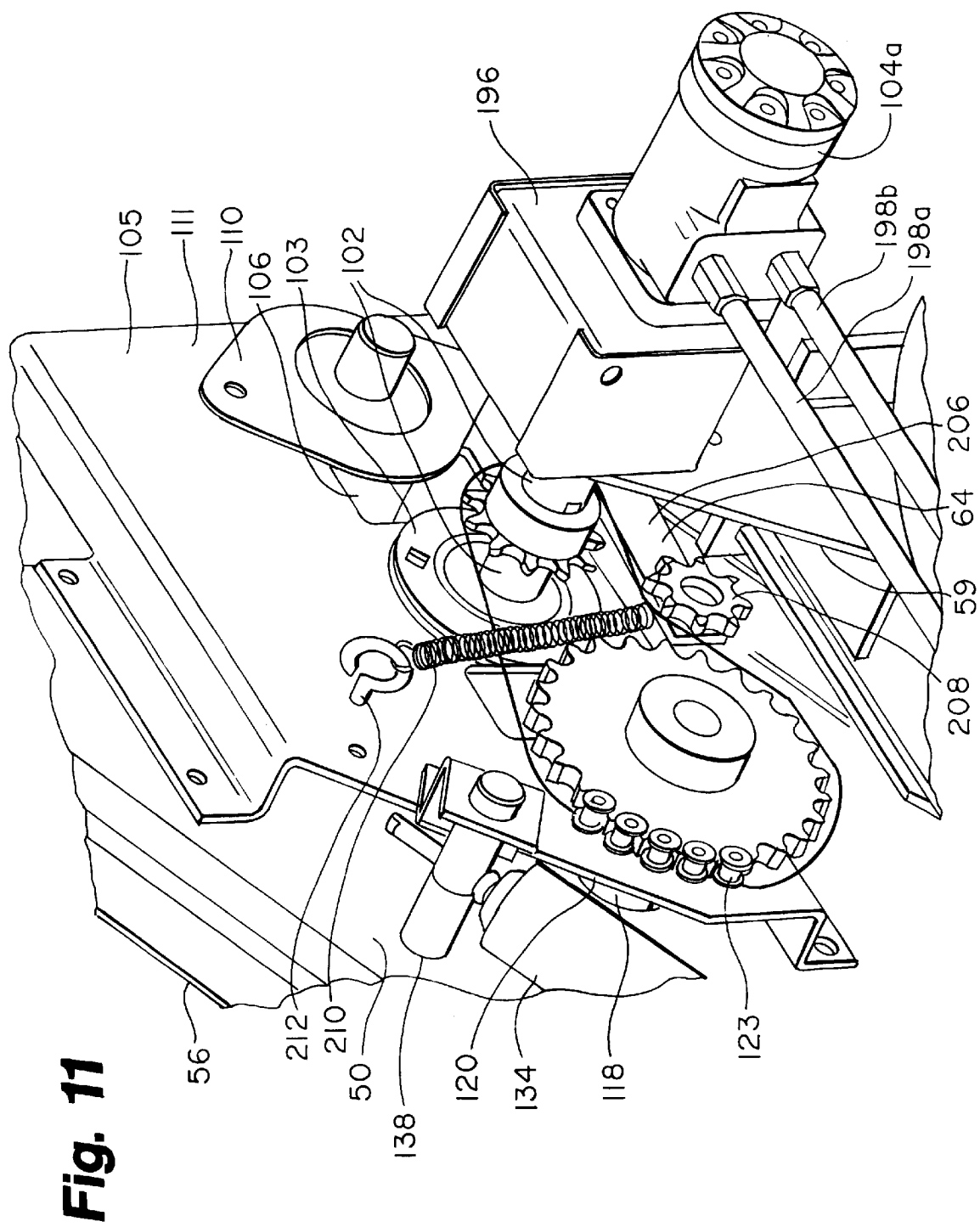
FIG. 11 is a perspective view of the drive of FIG. 10 with the cover removed.

The second subcomponent of the pickup head 16 is the draper conveyor system 54 as depicted in FIGS. 1–5 and 8–11. The draper conveyor system 54 has two spaced apart rotors 100, 106, and a generally continuous belt 112 extending around the two rotors 100, 106. Rotor 100 is the driven rotor. Rotor 100 has an axial bar 102 forming the center axis of the rotor 100. The axial bar 102 is carried in side member journals 103, a side member journal 103 being disposed in bores defined in brackets 105 coupled to each of the two side members 50, 52. As described above, extensions of the axial bar 102 on both ends thereof are borne in journals 58 and provide the pivot points for a first degree of motion (the up-down rotary motion) of the pickup head 16. A hydraulic motor 104 may be disposed on the right side of the pickup head 16 and is rotatably coupled to the axial bar 102 of the driven rotor 100. Alternatively, the driven rotor 100 can be powered by a motor 104a that also powers the pickup conveyor system 56 as depicted in FIGS. 10 and 11. Such motor is typically disposed on the left side of the pickup head 16 and acts directly on the axial bar 102. The motor 104a is powered by hydraulic fluid delivered through lines 198a, 198b. It should be noted that the drive components driven by motor 104a are normally shielded by cover 101, as depicted in FIG. 10.

The rotor 106 is the idler rotor. The idler rotor 106 is spaced apart from the driven rotor 100. In a preferred embodiment, the idler rotor 106 is disposed so that it projects slightly into the space defined by the transverse conveyor assembly 14. Accordingly, the axial bar 108 of the idler rotor 106 is disposed within the space defined by the transverse conveyor assembly 14 as depicted from the left in FIG. 3 and from the right in FIG. 9. The axial bar 108 is borne in side member journals 110, journals 110 being carried by rearward directed extensions 111 of the bracket 105.

A substantially continuous belt 112 is disposed around the driven rotor 100 and the idler rotor 106. In a preferred embodiment, the belt 112 is formed of a plurality of adjacent, independent belt segments 114. See FIG. 1. Each of the belt segments 114 is formed in a continuous loop by staples 116 coupling the two belt ends together. Advantageously, if a particular belt segment 114 becomes worn or torn, that particular belt segment 114 can be replaced with a new belt segment 114 that is simply stapled in place in a loop around rotors 100, 106 using staples 116. In this way, the total belt 112 does not have to be replaced if only a portion of the belt 112 is damaged.

An advantage of the draper conveyor system 54 of the present invention is that by using two spaced apart rotors 100, 106 that are relatively small with respect to the rotor 118 (further described below) of the pickup conveyor system 56, the draper conveyor system 54 can be disposed in close proximity to the pickup conveyor system 56. Such close proximity minimizes the potential for product material that is being carried up the pickup conveyor system 56 wrapping around the draper conveyor system 54 and plugging up the system requiring a time consuming clean out. By having two spaced apart rotors 100, 106 comprising the draper conveyor system 54, the belt 112 defines a rather flat, upward-directed, moving surface extending rearward from the pickup conveyor system 56. This flat surface carries the product rearward and assists in discharging the product material into the transverse conveyor assembly 14 and further minimizes the potential for clogging the draper conveyor system 54 with product material.

The third major subcomponent of the pickup head 16 is the pickup conveyor system 56 as depicted in FIGS. 1–6 and 8–11. The pickup conveyor system 56 has three major subcomponents: driven rotor 118, idler rotor 124, and pickup belt 130. The driven rotor 118 has a substantially greater diameter than the driven rotor 100 of the draper conveyor system 54 positioned proximate thereto. The driven rotor 118 has an axial shaft 120 that is borne in two side member journals 122, positioned in the respective side members 50, 52. The driven rotor 118 may be powered by a motor 104a. The motor 104a is coupled to axial shaft 120 by suitable gearing in the gear box 196. The motor 104a is preferably a hydraulic motor driven by hydraulic fluid pumped in hydraulic lines 198a, 198b. As indicated above, the motor 104a may also simultaneously drive the driven rotor 100 of the draper conveyor system 54 by means of a link chain 123. Other suitable split drive means may also be used. As depicted in FIG. 11, the split drive includes a first sprocket 200 coupled to axial bar 102 and second sprocket 202 coupled to axial shaft 120 by link chain 123. A tensioner 204 maintains the tension of link chain 123 by exerting a generally upwardly directed bias on link chain 123. The tensioner 204 includes a pivot arm 206 that is pivotally coupled to bracket 105 at a first proximal end. A tensioner sprocket 208 is rotatably coupled to the pivot arm 206 proximate at a distal end thereof. The sprocket 208 is engaged with the link chain 123. A spring 210 is coupled at a first end to the distal end of the pivot arm 206 and at a second end to bracket 105 by an I-bolt connector 212.

The idler rotor 124 of the pickup conveyor system 56 is positioned spaced apart from the driven rotor 118 at the leading pickup point 57 where the product material is picked up from the field surface. See FIGS. 1–3 and 7–8. The idler rotor 124 has an axial shaft 126 that is carried in side member journals 128. A side member journal 128 is positioned in each of the side members 50, 52. The side member journals 128 are designed such that a certain amount of independent motion of the two side members 50, 52 is accommodated by twisting the axial shaft 126 within the side member journals 128. Journals 128 are designed with extra load carrying capacity in order to accommodate the stress of the previously indicated side-to-side twisting motion of the pickup head 16. This twisting motion of the leading portion of the pickup head 16 is a second degree of freedom of the pickup head 16 and is depicted in FIG. 2. As depicted in FIG. 2, the right side of the pickup head 16 is shiftable as indicated by arrow A wherein the centerline 129 of the side member 52 is shiftable between a low disposition (at the tail of arrow A) to a high disposition (at the head of arrow A). This motion is independent of any motion of the left side member 50 and is accommodated by motion of the axial shaft 126 in the two side members journals 128.

The pickup belt 130 of the pickup conveyor system 56 is positioned around the driven rotor 118 and the idler rotor 124. The pickup belt 130 has a plurality of spring loaded tines 132 to assist in picking up the product material from the field surface.

As best depicted in FIGS. 3 and 9, a pair of dampeners 134 are positioned on either side of the pickup head 16. The dampeners 134 are coupled at a first end by a frame coupling 136 to the frame 12 of the windrow merger 10. The dampeners 134 are coupled at a second end to the respective side members 50, 52 by a side member coupling 138. See FIG. 11. The dampeners 134 are effective in dampening any tendency for bouncing motion of the pickup head 16 as the windrow merger 10 travels over uneven ground.

The fourth major component of the windrow merger 10 is the tricycle suspension system 17. The suspension system 17 is best depicted in FIGS. 3 and 9, although all other figures depict at least certain components of the suspension system 17. The tricycle suspension system 17 is comprised of the following subcomponents: following wheel assembly 150, left truck assembly 152, and right truck assembly 154.

The following wheel assembly 150 includes a wheel 156. The wheel 156 is borne by a pivotable castor mount 158. The pivotable castor mount 158 is pivotably disposed within a castor receiver 160. The castor receiver 160 is mounted on a shiftable parallelogram mount 162. The shiftable parallelogram mount 162 provides for a certain amount of up-down motion of the wheel 156, as limited by the spring 164. The mount 162 includes parallel arms 168 that are pivotable about pivot points 166. The spring 164 is mounted diagonally from corner to corner of the shiftable parallelogram mount 162 to restrain the amount of motion permitted of the shiftable parallelogram mount 162, responsive primarily to windrow merger 10 travel over uneven ground surface.

The left truck assembly 152 and the right truck assembly 154 are essentially formed of identical components. Accordingly, the description here will be with respect to the left truck assembly 152, as depicted in FIGS. 3–8, but also applies to the right truck assembly 154, like numbers denoting like components. The right truck assembly 154 is best depicted in FIG. 9, although other figures also include components of the right truck assembly 154. The left truck assembly 152 includes a carriage 170, a front wheel 172, and a rear wheel 174. The carriage 170 has a carriage axle 176 disposed approximately even distance between the front wheel 172 and the rear wheel 174. The carriage axle 176 is rotatably borne by a plate 177 that depends from the cantilever beam 20a of the frame 12. The front wheel axle 178 supports the front wheel 172 and is borne by the leading portion of the carriage 170. The rear wheel axle 180 supports the rear wheel 174 and is borne by the trailing portion of the carriage 170.

A suspension arm 182 projects forward from the leading portion of the carriage 170. A first end 184 of a carriage tension spring 186 is coupled to a bore 185 defined in the suspension arm 182. A second end 187 of the carriage tension spring 186 is coupled by an eye bolt 189 to the cross member 124 of the frame 12. See FIGS. 6–6b.

As depicted in FIGS. 6, 6b, 7 and 7a, a carriage stop 188 projects outwardly sideways from the carriage 170. The carriage 188 stop may include a rubber bumper 189 bonded thereto. The carriage stop 188 is disposed in registry with the pickup head stop 190 disposed on the leading portion of the pickup head 16. Rising action of the front wheel 172 responsive to the front wheel 172 riding over a mound in the ground surface 192 of the field causes the carriage stop 188 to rise from the disposition of FIG. 4 to come into contact with the pickup head stop 190 as depicted in FIG. 6, thereby raising the leading pickup portion 57 of the pickup head 16 and carrying the pickup head 16 upward with additional rising motion of the front wheel 172. Such action keeps the leading pickup portion 57 of the pickup head 16 from coming into direct contact with the surface 192 of the field over which the windrow merger 10 is operating.

Pickup operations are generally depicted in FIG. 2. The windrow merger 10 is towed forward as indicated by arrow A. Forage is picked up at leading pickup edge 57 and transported up pickup belt 130, across belt 112 and deposited on transverse conveyor 36, as indicated by arrow C. The forage is then translated to the right (arrow D) and discharged out chute 40, as indicated by arrow D.

In order to effect the aforementioned merging operations, the windrow merger 10 of the present invention may be transported at relatively high speed to a field having windrows laid out therein for merging. Such transportation is typically done by coupling the clevis 28 of the tongue 26 to a tractor. Transportation of the windrow merger 10 is accomplished with the windrow merger 10 being borne on the tricycle suspension 17 with the pickup head 16 raised in the transport configuration as depicted in FIG. 8.

Figure 4:
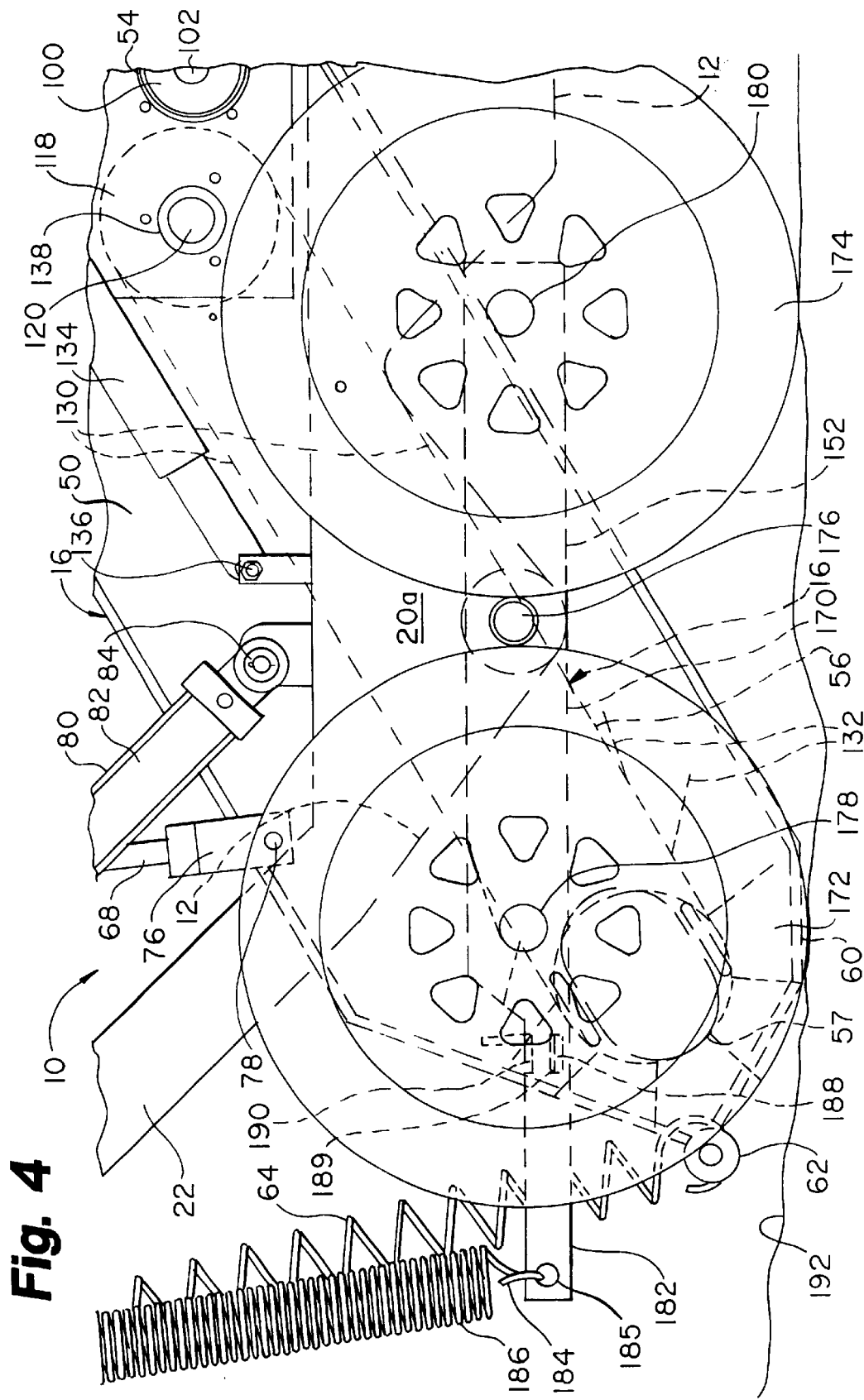
FIG. 4 is a left side elevational view of the suspension components associated with the left truck assembly, a number of components being depicted in phantom.
Figure 5:
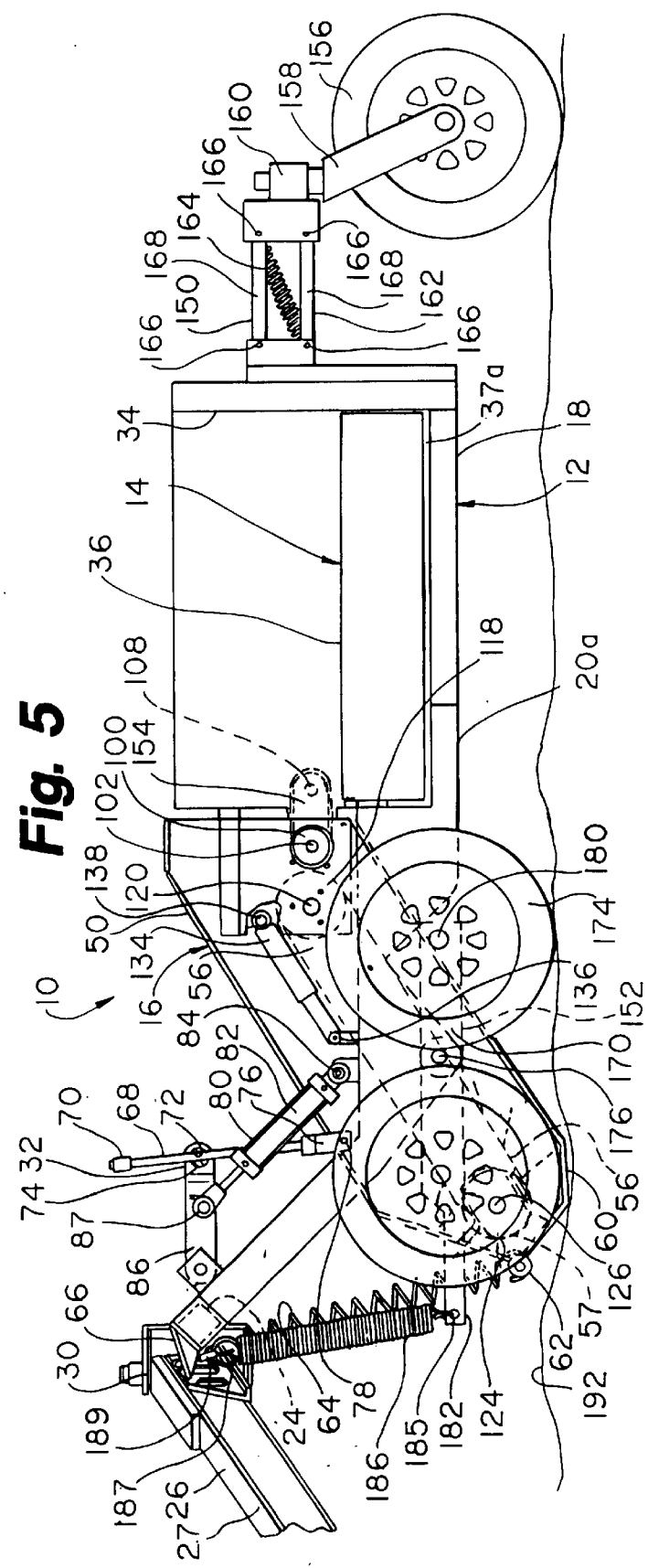
FIG. 5 is a left side elevational view of the windrow merger of FIG. 3 with the pickup head skid in engagement with the field surface.
Figure 7:
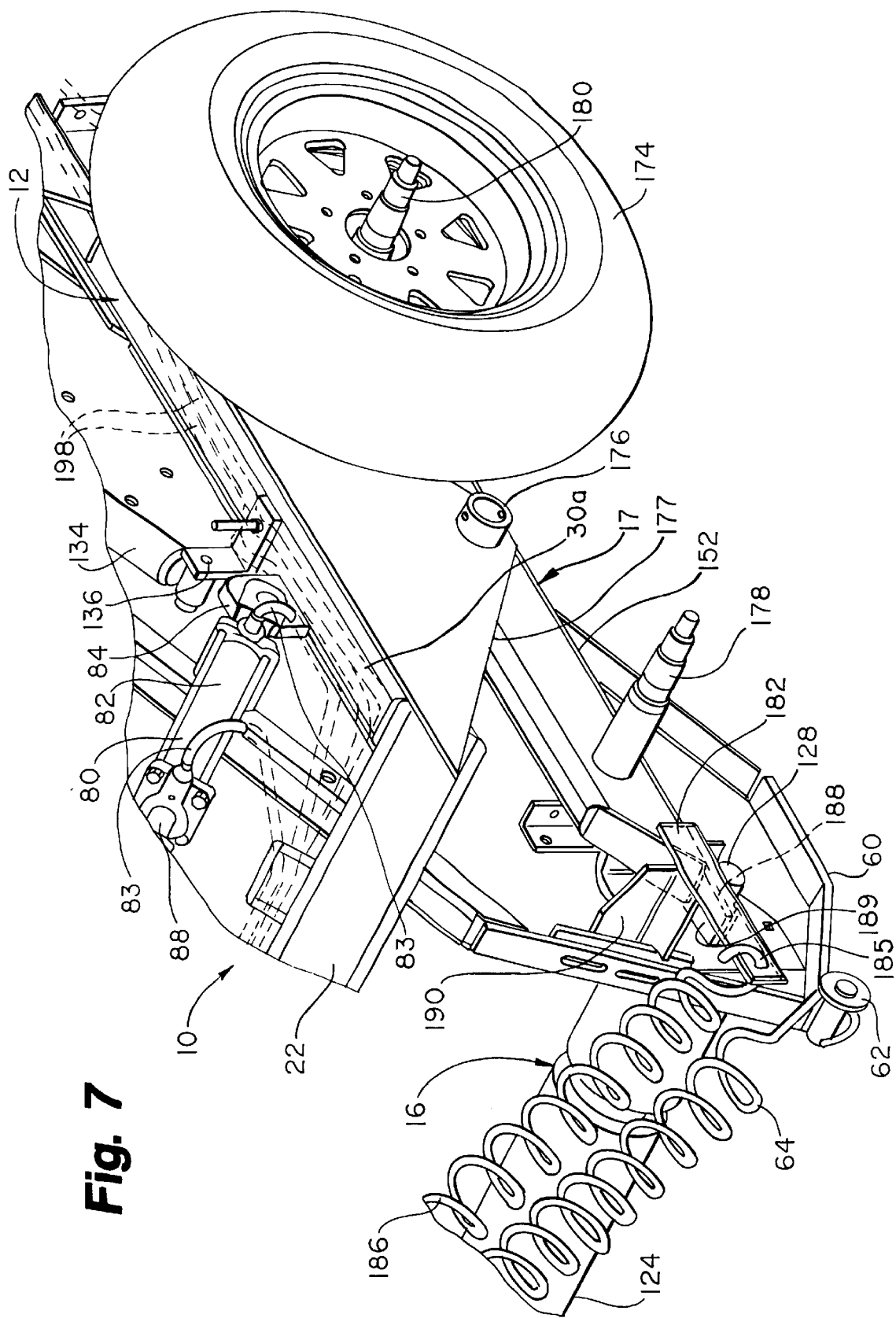
FIG. 7 is a perspective view of the left truck assembly with the front wheel removed.
Figure 7A:
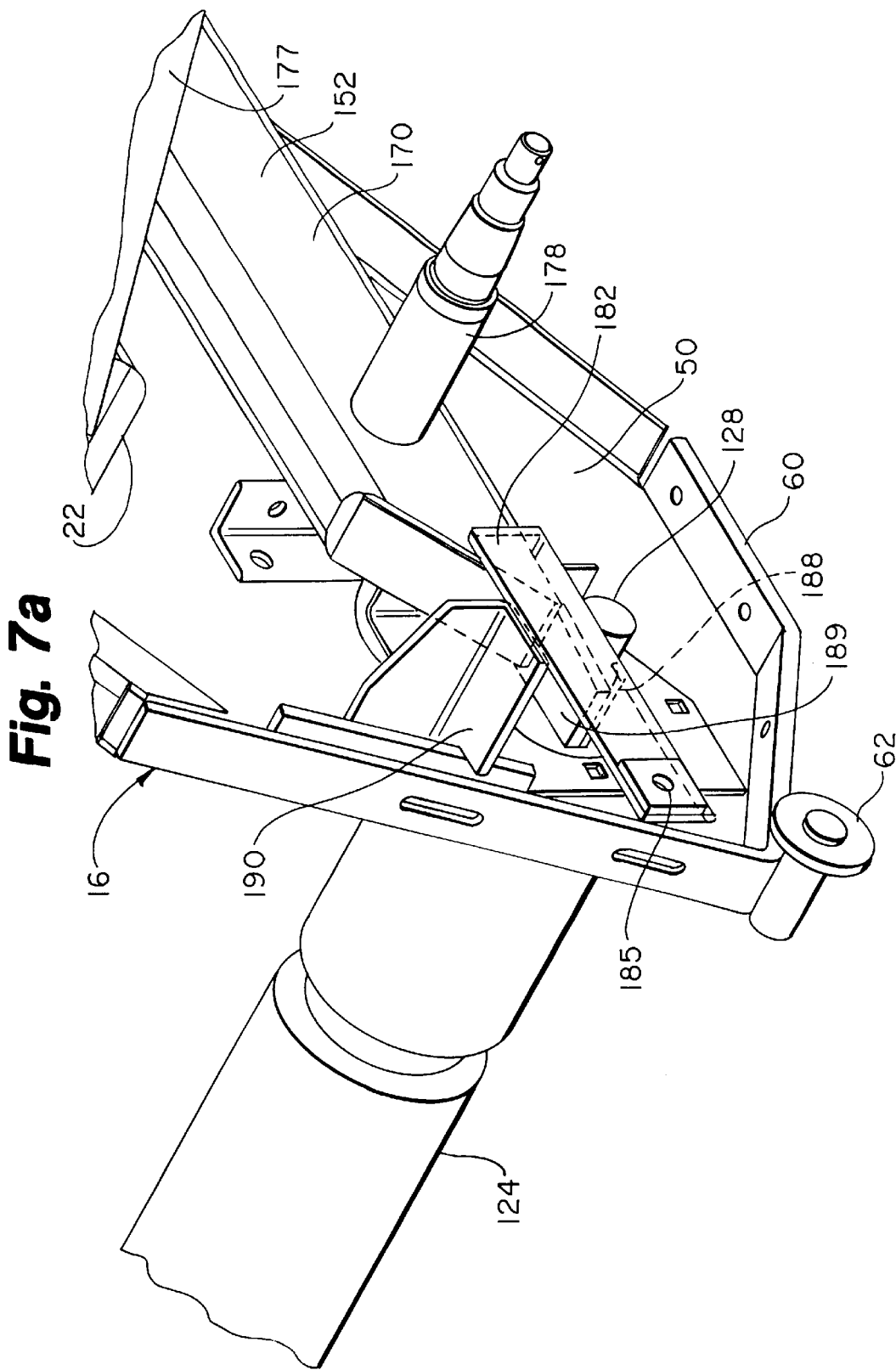
FIG. 7a is an enlarged depiction of the left truck assembly as depicted in FIG. 7.

Once at the site where the merging operations are to be performed, the pickup head 16 is lowered from the transport configuration of FIG. 8 to the pickup configuration of FIG. 3 by retraction of the piston arm 88 of the hydraulic cylinder 82 of the lift assembly 80. Such retraction places the leading pickup edge 57 of the pickup head 16 in close proximity to the ground surface 192 beneath the windrow merger 10. In the pickup configuration, the two carriage tension springs 186 exert an upward rotational bias on the respective carriages 170 of the left truck assembly 152 and the right truck assembly 154. This bias urges the carriages 170 into rotation about the carriage axle 176. Such rotation shifts the majority of the weight borne by the left truck assembly 152 and the right truck assembly 154 to the respective rear wheels 174. An effect of such biasing is that the respective front wheels 172 of the left truck assembly 152 and right truck assembly 154 act essentially as gage wheels, maintaining the pickup leading edge 57 of the pickup head 16 at a proper height with respect to the underlying field surface 192. Referring to FIGS. 4, 6, and 6b, the gaging action of the front wheel 172 of the left truck assembly 152 is apparent. It should be noted that the gaging action of the front wheel 172 of the right truck assembly 154 operates in a similar fashion to the left truck assembly 152 depicted in the noted figures. As depicted in FIG. 4, the pickup head 16 is being maintained in its relationship to the field surface 192 by the cooperative action of the skid 60 and the upward bias of the pickup head spring 64. In such disposition, there is a certain amount of free space existing between the carriage stop 188 and the pickup head stop 190.

When a rise in the field surface 192 occurs (see FIG. 6), the front wheel 172 rises as its rides over the field surface 192. This rising action causes the carriage stop 188 to come into contact with the pickup head stop 190. Once so engaged, the continued rising motion of the front wheel 172 carries the pickup leading edge 57 of the pickup head 16 upward as well. Such action ensures that the pickup leading edge 57 of the pickup head 16 maintains its proper disposition with respect to the field surface 192. Bouncing of the pickup head is dampened by dampeners 134. The lowest position of the pickup head 16 with respect to the frame 12 is ultimately set by the travel permitted before the stops 70 of the stop rods 68 come into contact with the carrier 74. The stops 70 may be positioned as desired to define the maximum depressed disposition of the pickup head 16.

The aforementioned gaging action of the front wheel 172 of the left truck assembly 152 is independent from the gaging action of the front wheel 172 of the right truck assembly 15 such that a rise in the field surface 192 on the right side of the windrow merger 10 results in the independent twisting motion of the pickup leading edge of the pickup head as depicted in FIG. 2. This side to side, twisting motion of the pickup leading edge 57 of the pickup head 16 comprises the second degree of freedom of the pickup head.

Those skilled in the art will recognize that there are numerous variations and modifications of this invention which are encompassed by its scope. Accordingly, the foregoing description should be considered illustrative of the invention and not deemed to limit its scope.

What is claimed is:

1. A windrow merger for merging product material disposed in a windrow on a ground surface, the windrow merger having a transverse conveyor assembly carried on a merger frame, at least a portion of the frame underlying the transverse conveyor assembly, a tongue operably pivotally coupled to the merger frame, the tongue being coupable to a vehicle for towing the windrow merger, the windrow merger comprising:

a pickup head having a pickup conveyor system including a rotatable pickup conveyor belt for picking up product material disposed in a windrow on a field surface, the pickup head being pivotally coupled to the merger frame and having a leading pickup edge, the pickup head having suspension means for suspending the leading pickup edge such that the leading pickup edge exhibits two degrees of motional freedom, wherein one of the two degrees of motional freedom of the leading pickup edge is substantially side-to-side pivotal twisting motion;

the pickup head conveyor belt being rotationally borne on a first rotor, the first rotor being disposed substantially coincident with the leading pickup edge, the first rotor having an axial shaft;

the axial shaft being journalled by a first rotor axial shaft first journal at a first shaft end to a first pickup head side member and being journalled by first rotor axial shaft second journal at a second shaft end to a second pickup head side member, the first rotor axial shaft first and second journals accommodating the side-to-side pivotal motion of the pickup head, the side-to-side pivotal motion of the pickup head comprising independent pivotal motion of the first and second pickup head side members.

2. The windrow merger of claim 1 wherein another one of the degrees of motional freedom of the leading pickup edge is substantially up-down pivotal motion.

3. The windrow merger of claim 1 wherein the suspension means for suspending the leading pickup edge includes at least a first biasing means for biasing the leading pickup edge in an upwards direction.

4. The windrow merger of claim 3 wherein the first biasing means for biasing the leading pickup edge in an upwards direction is a spring having a first end coupled to the pickup head and a second end coupled to a merger frame member.

5. The windrow merger of claim 1 wherein the suspension means for suspending the leading pickup edge includes at least a first dampening means for dampening at least a first degree of leading pickup edge pivotal motion.

6. The windrow merger of claim 5 wherein the first dampening means for dampening at least a first degree of leading pickup edge pivotal motion is a shock absorber having a first end coupled to the pickup head and a second end coupled to a merger frame member.

7. The windrow merger of claim 1 wherein the pickup head conveyor belt is rotationally borne on a second rotor, the second rotor being a driven rotor for imparting rotational motion to the conveyor belt.

8. The windrow merger of claim 1 further including a draper conveyor system, being disposed proximate a discharge end of the pickup conveyor belt for receiving product material discharged therefrom and conveying the product material for disposal on the transverse conveyor assembly.

9. The windrow merger of claim 8 wherein the draper conveyor system includes a driven rotor spaced apart from an idler rotor, a rotatable continuous belt being borne on the driven rotor and the idler rotor.

10. The windrow merger of claim 9 wherein the draper conveyor system rotatable continuous belt is formed of a plurality of individual, adjacent continuous belt segments.

11. The windrow merger of claim 10 wherein each of the plurality of individual, adjacent continuous belt segments has a first end and a second end, the first and second ends being selectively joinable to form a continuous belt segment.

12. The windrow merger of claim 11 wherein the first and second ends of each of the plurality of individual, adjacent continuous belt segments are selectively joinable by staples to form a continuous belt segment.

13. The windrow merger of claim 9 wherein at least a first rotor of the draper conveyor system is disposed substantially intruding into a conveying space defined by the transverse conveyor assembly.

14. The windrow merger of claim 13 wherein the first rotor of the draper conveyor system is the idler rotor.

15. The windrow merger of claim 9 wherein the rotatable continuous belt of the draper conveyor system presents a substantially flat upwardly-directed moveable conveying surface extending between the driven rotor and the idler rotor.

16. The windrow merger of claim 1 including a tricycle suspension system.

17. The windrow merger of claim 16 wherein the tricycle suspension system includes a trailing wheel assembly operably coupled to the merger frame, a left truck assembly operably coupled to the merger frame, and a right truck assembly operably coupled to the merger frame.

18. The windrow merger of claim 1 wherein the pickup head is selectively shiftable between a pickup disposition wherein the conveyor belt leading pickup edge is disposed proximate an underlying ground surface and a transport disposition wherein the conveyor belt leading pickup edge is disposed substantially elevated above the underlying ground surface.

19. The windrow merger of claim 18 further including a selectively extensible lift assembly for shifting the pickup head between the pickup disposition and the transport disposition.

20. The windrow merger of claim 19 wherein the lift assembly includes extender means having a cylinder having a translatable, extendable piston, a first end of the extender means being operably coupled to the merger frame and a second end of the extender means being operably coupled to the pickup head.

21. The windrow merger of claim 20 wherein the lift assembly acts substantially simultaneously on two spaced apart pickup head side members for shifting the pickup head between the pickup disposition and the transport disposition.

22. The windrow merger of claim 18 further including selectively adjustable stop means for limiting a depression of the pickup head relative to the merger frame when the pickup head is in the pickup disposition.

23. A windrow merger for merging product material disposed in a windrow on a ground surface, the windrow merger having a transverse conveyor assembly carried on a merger frame, at least a portion of the frame underlying the transverse conveyor assembly, a tongue operably pivotally coupled to the merger frame, the tongue being coupable to a vehicle for towing the windrow merger, the windrow merger comprising:

a pickup head having a pickup conveyor system including a rotatable pickup conveyor belt for picking up product material disposed in a windrow on a field surface, the pickup head being pivotally coupled to the merger frame and having a leading pickup edge, the pickup head having suspension means for suspending the leading pickup edge such that the leading pickup edge exhibits two degrees of motional freedom, wherein one of the two degrees of motional freedom of the leading pickup edge is substantially side-to-side pivotal twisting motion;

a tricycle suspension system, the tricycle suspension system including a trailing wheel assembly operably coupled to the merger frame, a left truck assembly operably coupled to the merger frame, and a right truck assembly operably coupled to the merger frame, the trailing wheel assembly of the tricycle suspension system includeing a shiftable articulating mount, the mount being fixedly coupled to the merger frame and the mount pivotally supporting a trailing wheel.

24. The windrow merger of claim 23 wherein the shiftable articulating mount of the trailing wheel assembly includes a biasing member for limiting the articulations of the mount.

25. The windrow merger of claim 24 wherein the shiftable articulating mount of the trailing wheel assembly is a four link parallelogram being pivotable at each of the four corners of the parallelogram.

26. The windrow merger of claim 25 wherein the biasing member of the shiftable articulating mount of the trailing wheel assembly is a spring, the spring having a first end coupled to the mount proximate a first corner of the parallelogram and having a second end coupled to the mount proximate a second corner of the parallelogram, the second corner being diagonally disposed with respect to the first corner.

27. The windrow merger of claim 23 wherein the left truck assembly is disposed proximate a left side of the pickup head and the right truck assembly is disposed proximate a right side of the pickup head, the left truck assembly and the right truck assembly each bearing a portion of the weight of the pickup head.

28. The windrow merger of claim 27 wherein the left truck assembly and the right truck assembly each have tandem wheels comprising a leading wheel and a trailing wheel.

29. The windrow merger of claim 28 further including biasing means acting on the left truck assembly and the right truck assembly to shift a greater portion of the weight borne by the each of the left truck assembly and the right truck assembly from the respective leading wheel to the respective trailing wheel.

30. The windrow merger of claim 28 wherein the leading wheel of each of the left truck assembly and the right truck assembly is operably couplable to the pickup head and acts as a pickup head gage wheel.

31. The windrow merger of claim 28 further including a left truck assembly carriage and right truck assembly carriage, the left truck assembly carriage and the right truck assembly carriage each being pivotally coupled to the merger frame.

32. The windrow merger of claim 31 wherein the left leading wheel and trailing wheel are rotatably coupled to the left truck assembly carriage and the right leading wheel and trailing wheel are rotatably coupled to the right truck assembly carriage.

33. The windrow merger of claim 32 further including a left spring operably coupled to a left truck assembly carriage leading portion and to the merger frame and a right spring operably coupled to a right truck assembly carriage leading portion, the left and right springs exerting a generally upward bias on the respective left truck assembly and right truck assembly, the bias tending to shift weight borne by the respective left truck assembly and right truck assembly to the left trailing wheel and the right trailing wheel respectively.

34. The windrow merger of claim 33 further including a left carriage stop operably coupled to the left truck assembly carriage and a right carriage stop operably coupled to the right truck assembly carriage, the left carriage stop being in registry with a left pickup head stop and the right carriage stop being in registry with a right pickup head stop.

35. The windrow merger of claim 34 wherein independent rising motion of the left truck assembly leading wheel causes the left carriage stop to come in contact with the left pickup head stop, thereby lifting the pickup head left side, and independent rising motion of the right truck assembly leading wheel causes the right carriage stop to come in contact with the right pickup head stop, thereby lifting the pickup head right side.

36. The windrow merger of claim 35 wherein independent rising motion of the left truck assembly leading wheel and independent rising motion of the right truck assembly leading wheel acting on the respective left and right sides of the pickup head acts to cause a side-to-side twisting motion of the pickup head.

37. The windrow merger of claim 35 wherein independent rising motion of the left truck assembly leading wheel and independent rising motion of the right truck assembly leading wheel acting on the respective left and right sides of the pickup head acts to cause an up-down rotational motion of the pickup head about left and right pickup head journalled pivot points.

38. A windrow merger for merging product material disposed in a windrow on a ground surface, the windrow merger having a transverse conveyor assembly carried on a merger frame, at least a portion of the frame underlying the transverse conveyor assembly, a tongue operably pivotally coupled to the merger frame, the tongue being coupable to a vehicle for towing the windrow merger, the windrow merger comprising:

a pickup head having a pickup conveyor system including a rotatable pickup conveyor belt for picking up product material disposed in a windrow on a field surface, the pickup head being pivotally coupled to the merger frame and having a leading pickup edge, the pickup head having suspension means for suspending the leading pickup edge such that the leading pickup edge exhibits two degrees of motional freedom, wherein one of the two degrees of motional freedom of the leading pickup edge is substantially side-to-side pivotal twisting motion;

the pickup head conveyor belt being rotationally borne on a second rotor, the second rotor being a driven rotor for imparting rotational motion to the conveyor belt, the second rotor having an axial shaft, the axial shaft being journalled by first rotor axial shaft journal at a first shaft end to a first merger frame member and being journalled by second rotor axial shaft journal at a second shaft end to a second merger frame member, the first and second rotor axial shaft journals accommodating a substantially up-down pivotal motion of the pickup head, the up-down pivotal motion of the pickup head comprising a first degree of motional freedom of the pickup head.

39. A windrow merger for merging product material disposed in a windrow on a ground surface, the windrow merger having a transverse conveyor assembly carried on a merger frame, at least a portion of the frame underlying the transverse conveyor assembly, a tongue operably pivotally coupled to the merger frame, the tongue being coupable to a vehicle for towing the windrow merger, the windrow merger comprising:

a pickup head having a pickup conveyor system including a rotatable pickup conveyor belt for picking up product material disposed in a windrow on a field surface, the pickup head being pivotally coupled to the merger frame and having a leading pickup edge, the pickup head having suspension means for suspending the leading pickup edge such that the leading pickup edge exhibits two degrees of motional freedom, wherein one of the two degrees of motional freedom of the leading pickup edge is substantially side-to-side pivotal twisting motion, the pickup head being selectively shiftable between a pickup disposition wherein the conveyor belt leading pickup edge is disposed proximate an underlying ground surface and a transport disposition wherein the conveyor belt leading pickup edge is disposed substantially elevated above the underlying ground surface; and a selectively adjustable stop means for limiting the depression of the pickup head relative to the merger frame when the pickup head is in the pickup disposition the selectively adjustable stop means includeing a left stop rod operably coupled at a first end to a left leading portion of the pickup head and a right stop rod operably coupled at a first end to a right leading portion of the pickup head, the left and right stop rods each having an adjustable stop member disposed proximate a second end.

40. The windrow merger of claim 39 wherein the left stop rod and the right stop rod are each operably, independently, slidably coupled to a merger frame member.

41. The windrow merger of claim 40 wherein the left stop rod stop member and the right stop rod stop member are engageable with the merger frame member to limit the depression of the pickup head relative to the merger frame.

42. The windrow merger of claim 41 wherein the left stop rod stop member and the right stop rod stop member are engageable with the merger frame member by extension of a selectively extensible lift assembly for shifting the pickup head from the pickup head disposition and the transport disposition.

43. The windrow merger of claim 42 wherein the left stop rod stop member and the right stop rod stop member are engaged with the merger frame member by an initial length of extension of the selectively extensible lift assembly, further extension of the lift assembly shifting the pickup head from the pickup head disposition and the transport disposition.

\* \* \* \* \*